Aug. 12, 1930.  C. G. OLSON  1,772,634
HOB
Filed May 20, 1927  2 Sheets-Sheet 1
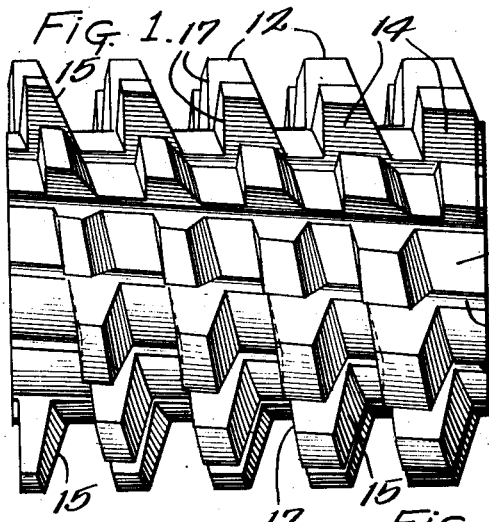
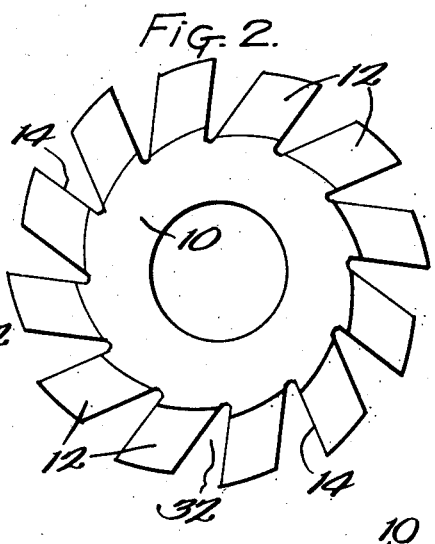
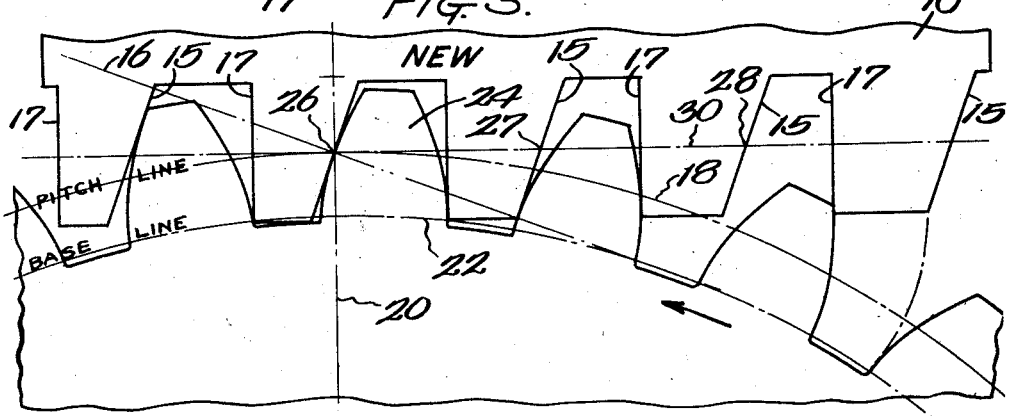
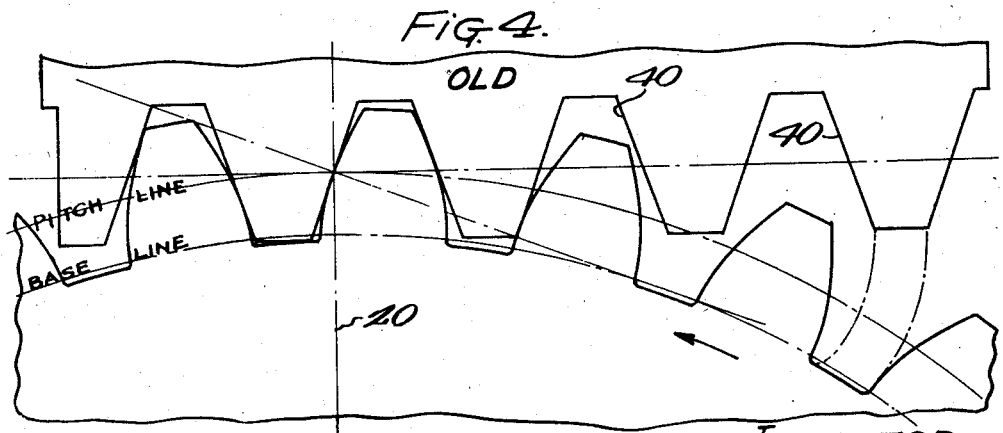
INVENTOR
CARL G. OLSON

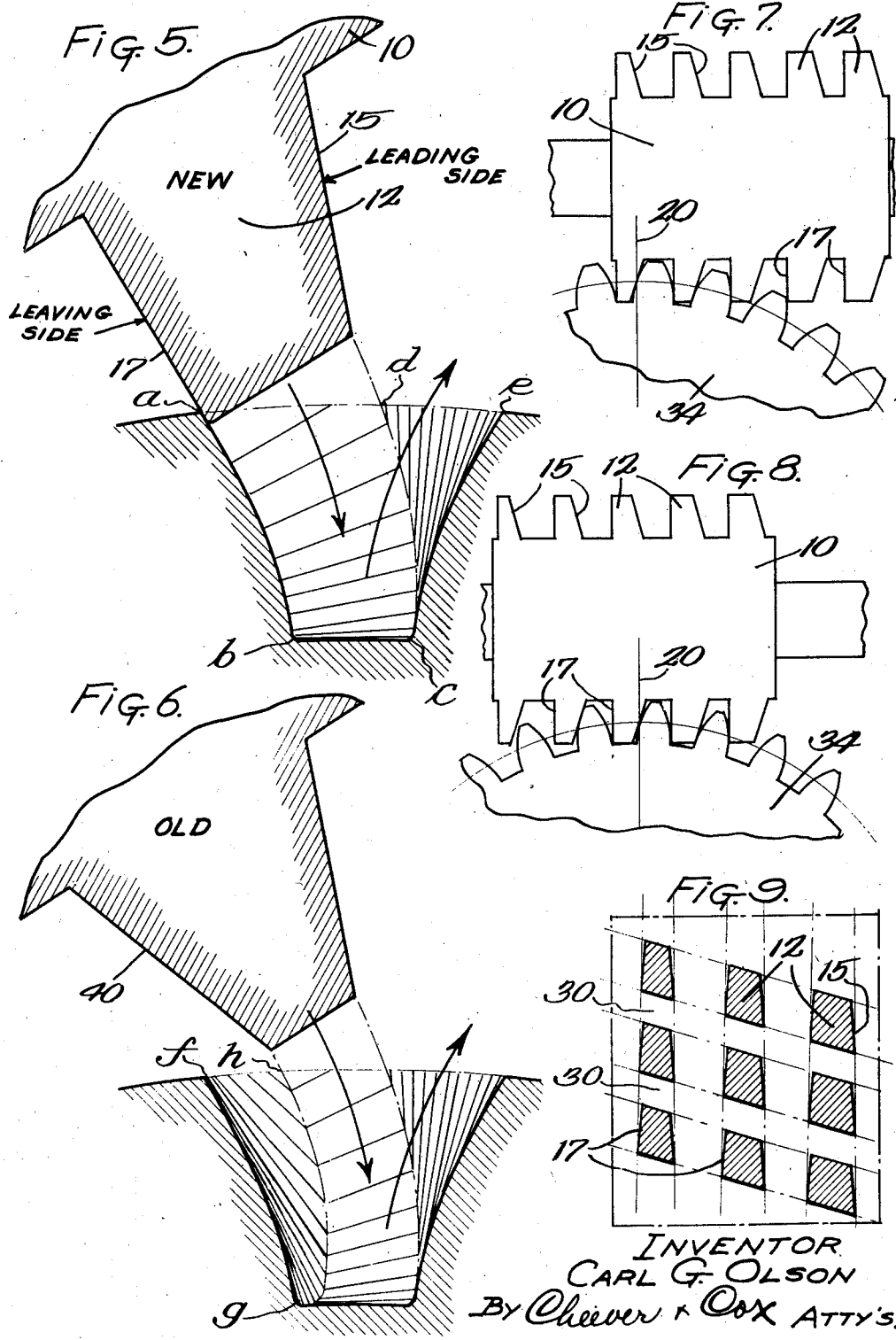

Patented Aug. 12, 1930

1,772,634

UNITED STATES PATENT OFFICE

CARL G. OLSON, OF CHICAGO, ILLINOIS, ASSIGNOR TO ILLINOIS TOOL WORKS, OF CHICAGO, ILLINOIS, A CORPORATION OF ILLINOIS

HOB

Application filed May 20, 1927. Serial No. 192,857.

This invention relates to hobs and is analogous to the invention described in my copending application filled March 25, 1927, Serial No. 178,248. One object of the present invention is to provide a hob in which all, or practically all the cutting will be performed by the cutting edges at the leading side and top of the tooth with little or no cutting to be performed by the edge at the leaving side. Another object is to provide a hob so constructed that it may produce different sizes or thicknesses of gear teeth by shifting it axially relatively to the gear blank. These and other objects are in addition to and in conjunction with the objects obtained by the invention described in the above mentioned companion application, wherein it is stated that the general purpose is to provide a roughing hob capable of greatly speeding up production over what is accomplished by hobs of the ordinary type.

I obtained my objects by a hob constructed in the manner illustrated in the accompanying drawing in which Figure 1 is a side view of a double thread hob embodying the invention.

Figure 2 is an end view of the hob looking towards the right in Figure 1.

Figure 3 is a diagrammatic view or outline view showing a hob of my construction in association with the gear it is cutting. The drawing shows the gear as having been completed.

Figure 4 is similar to Figure 3, but for comparative purposes shows the relation between the same gear and a hob of ordinary type.

Figure 5 is a diagrammatic view on an increased scale indicating the manner in which my improved hob acts in cutting the gear blank.

Figure 6 is similar to Figure 5, except that it shows the action of the ordinary type of hob.

Figures 7 and 8 are diagrammatic views illustrating the effect upon the gear teeth of shifting the improved hob axially with respect to the work.

Figure 9 is a sectional view indicating the appearance of the teeth if cut by a cylinder coaxial with the hob and passing through the teeth at same point between the top and bottom thereof.

Like numerals denote like parts throughout the several views.

As explained in my copending application the cutting of metal will be facilitated by increasing within proper limits, the sharpness of the cutting edge. The cutting operation is also facilitated by giving the cutting edge an obliquity relatively to its direction of motion to produce a shearing cut. My hob as constructed realizes both of these advantages and the cutting edges of the teeth are sharper than the cutting edges of the teeth of an ordinary hob and then the teeth of the hob shown in the said copending application.

In the drawings illustrating the principle of the present invention, the hob has a body 10, having teeth 12 arranged in the form of a double thread or helix. As shown in Figures 1 and 2, the teeth are undercut at the front, that is, their front surfaces 14 do not extend radially but if produced would pass behind the center of the hob. This is not an essential characteristic of my hob, but is advantageous in that it will cause the teeth to take a shearing cut.

On one side which for convenience I shall refer to as the "leading" side 15 shown at the right in Figure 5, the threads have a standard circular pitch lead, and the sides have an angular inclination equal to the pressure angle to be produced in the gear teeth. In other words in the particular design shown the hob teeth on one side have the same lead and slope as in the ordinary hob.

On the opposite side 17 which I shall call the "leaving" side the helical lead is different, corresponding to the circular or angular spacing of the teeth of the gear on the base circle, and on this side the angular inclination is reduced to zero, that is, the sides of the teeth are perpendicular to the axis of the hob. This will best be understood by reference to Figure 3, wherein the line 16 passes through the pitch circle 18 at the point where it is intersected by the principal or basic radius 20, said line 16 being inclined in accordance with the selected pressure angle. This pressure angle line 16 determines the base circle 22 in accordance with standard practice for involute gears. The line 16 is normal to the leading side of the hob tooth where the latter is tangent to the adjacent tooth 24 of the gear being produced. The point of tangency is indicated by 26, Figure 3, and as above stated the leading side of the hob teeth are standard as to angle of inclination and helical lead. In Figure 3 the helical lead is measured by the distance from said point 26 to point 27 and from point 27 to point 28, and so on, these points being determined by the intersection of the inclined hob tooth sides with the hob pitch line 30.

The straight or leaving sides of the hob teeth, being at right angles to the hob axis, are tangent to the gear teeth at or near the base line or circle 22, and hence it will be evident that the helical lead on this side of the teeth will be shorter than on the opposite side because obviously the circular pitch of the gear teeth is shorter along the base circle than along the pitch circle. This is because the base circle has a smaller diameter than the pitch circle and yet both are divided into the same number of lengths to produce a gear of any given number of teeth. Hence in my hob the teeth conform to different helical leads on different sides of the teeth. In other words the spacing of the sloping sides of the hob teeth is different from the spacing of the straight or vertical sides, one spacing being founded upon the pitch circle and the other on or about the base circle. The result of this is shown in Figures 3, 7 and 8, where it will be evident that in a right hand hob the teeth are thicker at the right end of the hob than at the left end. In other words, the hob teeth become progressively narrower in the direction of the lead of the hob.

In my present hob, as in the one shown in the said copending application, the flutes or gashes 30 run helically with the same hand lead as the thread helix. This is illustrated in Figures 1 and 9, particularly the latter, where it will be seen that this produces good sharp cutting edges at the front corners of the leading side of the teeth.

The cutting action of this improved hob is illustrated in Figure 5 in which it will be seen that the leaving side 17 does practically no cutting and that practically all of the cutting is done by the edges at the top and leading side of the tooth. Thus, practically speaking, the cutting is all performed by the top and one side of the teeth, and these possess a greater degree of sharpness than possessed by ordinary hobs.

The amount of metal removed by the top edge of the teeth will depend in part upon the thickness of the hob teeth which are acting. If we take Figure 5 as a typical example it may be said that the amount of metal removed by the top of the tooth is represented by the area $a, b, c, d$, while the amount removed by the leading side of the tooth is represented by the area $c, d, e$. No area is left to be cut by the leaving side of the tooth. This is in contrast to the action of the old style ordinary hob shown in Figure 6, where the leaving side 40 is called upon to remove a large amount of metal, for illustration the amount indicated by the area $f, g, h$. This is in spite of the fact that in an ordinary hob the cutting edge on the leaving side is very blunt.

In my hob the teeth are relieved at the top and at both sides. The relieving of the teeth on the straight side, that is, the leaving side, injects a special problem, for it will be evident particularly by Figure 9, that when such teeth are sharpened their profile area decreases. In other words, the front faces of the teeth in my hob decrease in size as the teeth are sharpened, and would consequently produce gear teeth of different sizes after sharpening than before sharpening. But this tendency is compensated for in my hob because the hob teeth are normally of graded thicknesses and as the hob teeth decrease in thickness from sharpening, they can, by being shifted axially, be made to correct what would otherwise produce an error. This principle is illustrated by contrasting Figure 7 with Figure 8. Let the line 20 in each case represent the principal or basic radius as before. The hob teeth at the left end of the hob are narrower, i. e. thinner, than at the right end, hence if the hob is placed as in Figure 7 with its left end near center line 20 of the gear blank 34, the resulting gear teeth will be wider i. e. thicker than if the hob is placed as in Figure 8 where the center line 20 comes nearer the right end of the hob. It will be evident from this that with my hob as the teeth become thinner from sharpening, the effect may be nullified by shifting the hob axially the proper amount. Another characteristic is that the thickness of the gear teeth generated may be varied by varying the position of the hob axially with respect to the center line of the gear blank.

It will be noted that in my hob, all of the teeth operate upon the molding generating principle in distinction to the "formed tooth" principle. In the latter principle, one tooth fills the space between two adjacent teeth in the work but in my hob the teeth are constructed according to the molding generating principle with the result, among other things, that my hob is capable of working on both sides of the center line of the gear. The result is that the hob can be shifted axially and by thus shifting it axially the gear teeth may be increased or decreased in thickness. It will also be noted that in my hob, the sharper cutting edge is on the sloping side of the tooth. The vertical side does little or no cutting. It will also be observed that in my hob, all of the teeth are rlaced uniformly with respect to the thread helix; that is, the vertical side of the teeth is always on the left side or always on the right side of the thread helix when the hob is viewed from the side. A single hob, in my preferred embodiment, does not have two types of teeth.

Having thus described my invention what I claim as new and desire to secure by Letters Patent is:

1. A hob, all of whose teeth are formed according to the molding generating principle and are spaced differently on one side than on the other side, and progress uniformly from one end of the hob to the other, at least within the active zone of the hob.

2. A molding generating hob, all of whose teeth have a smaller profile than the space between the teeth in the gear to be cut, the teeth being formed from a thread helix having a different helical lead on one side than on the other whereby the teeth get progressively thinner, all of the teeth along the helix being of uniform type and position with reference to the helix.

3. A hob, all of whose teeth are constructed upon the molding generating principle, the thread helix having a different lead on one side from the other side, and being of uniform type along the helix, and uniformly placed with reference to the thread helix, one side of the teeth being substantially vertical and the other side sloping, the gashes extending in a direction to give the cutting edges of the sloping sides a sharper angle than the cutting edges of the vertical sides.

4. A hob, all of whose teeth are constructed according to the molding generating principle, and whose zone of action may extend on both sides of the center line of the gear to be cut, the leaving side of all of the teeth being substantially vertical, whereby the decrease in profile area of said teeth due to sharpening may be rendered harmless by shifting the hob axially relative to the gear blank.

5. A molding generating hob, primarily adapted for roughing purposes, all of the teeth of the hob being symmetrical with respect to the thread helix, one side of the thread helix being approximately vertical and the opposite side sloping, and the sloping sides having a longer lead than the vertical sides.

6. A hob, all of whose teeth are constructed according to the molding generating principle whereby the hob is devoid of teeth occupying all of the space between two adjacent teeth in the gear to be cut, the hob having spiral gashes of the same hand lead as the thread helix, the opposite sides of the teeth having different angles of inclination and the side having the greatest angle of inclination having a sharper cutting edge than the side having th smaller angle of inclination.

7. A molding generating hob, whose teeth become progressively thinner from one end of the hob to the other, the hob teeth being formed on the molding generating principle, whereby the hob may be shifted axially and act on both sides of the center line of the gear to be cut, the slope on one side corresponding to the pressure angle of the gear to be cut and the slope on the opposite side being appreciably smaller, the gashes being of the same hand lead as the thread helix and the cutting edge of the teeth being sharper on the side where the sloping corresponds to the pressure angle than it is on the side where the slope is smaller, all of the teeth being placed symmetrically with respect to the thread helix.

8. A hob having teeth which are substantially vertical at one side and sloping at the opposite side, both sides of the teeth being relieved and the opposite sides having different helical leads whereby the teeth gradually become thicker toward one end of the hob, with the result that a decrease in profile area due to sharpening may be rendered harmless by shifting the hob axially relatively to the gear blank.

9. A hob having a series of teeth arranged to conform to a helix, and provided with cutting edges on one side and non-cutting edges on the opposite side, the cutting side having a longer helical lead than the non-cutting side, the non-cutting side being approximately vertical, and all of the teeth being constructed on the molding generating principle whereby the hob may act on both sides of the center line of the gear to be cut.

10. A hob having its teeth arranged in a plurality of threads or convolutions, one side of the teeth being substantially vertical and the opposite side sloping substantially in accordance with the pressure angle of the teeth to be cut, all of the teeth being constructed according to the molding generating principle whereby the hob may cut on both sides of the center line of the gear to be cut.

11. A hob having teeth having two acute shear cutting edges and an obtuse, non-cutting edge, the non-cutting edge being substantially vertical and all of the teeth being constructed on the molding generating principle.

12. A hob having undercut teeth having different angles of inclination at the opposite sides, and the different sides conforming to different helical leads.

13. A hob having undercut teeth relieved at the top and both sides, the different sides of the teeth having different angles of inclination and conforming to different helical leads.

14. A hob having a double thread, one side of the thread being approximately vertical and the other sloping, and the hob having helical gashes of the same hand lead as the thread, all of the teeth being constructed on the molding generating principle and arranged uniformly in the thread helix.

15. A hob having a double thread, one side of the thread being approximately vertical and the other sloping, and the hob having helical gashes of the same hand lead as the thread, the teeth being undercut and relieved at the top and both sides, the hob teeth being constructed on the molding generating principle whereby the hob may act on both sides of the center line of the hob, and all of the teeth being arranged uniformly in the thread helix, and the sloping sides having sharper cutting edges than the more vertical sides.

16. A hob having a plurality of equal helicoidal tapering threads, sloping gashes to divide a thread into rows of teeth, one side of the threads being approximately vertical and the other sloping, the front faces of the teeth being undercut by the sloping gashes and disposed angularly to the plane of rotation of the hob to thereby facilitate easy removal of metal by the cutting edges of the leading side and the top of the teeth.

17. A hob having teeth whose side edges are positioned at different angles with respect to the hob axis, both sides of the teeth being relieved, and the opposite sides having different axial leads whereby the teeth gradually become thicker toward one end of the hob, and whereby the sides generate on generating circles of different diameters and whereby the decrease in profile area of said teeth due to sharpening may be rendered harmless by shifting the hob axially to another fixed position relative to the gear blank.

In witness whereof, I have hereunto subscribed my name.

CARL G. OLSON.